United States Patent Office 3,256,203
Patented June 14, 1966

3,256,203
COOLING WATER TREATMENT AND COMPOSITIONS USEFUL THEREIN
Reed S. Robertson, Glen Ellyn, and Walter J. Ryzner, Chicago, Ill., assignors to Nalco Chemical Company, Chicago, Ill., a corporation of Delaware
No Drawing. Filed Nov. 18, 1963, Ser. No. 324,233
11 Claims. (Cl. 252—178)

The instant invention is directed to a process of inhibiting corrosion of iron surfaces in contact with cooling waters. More specifically, the subject invention relates to compositions which inhibit corrosion of iron in presence of cooling waters by aiding in formation of a protective iron oxide film over the iron substrate.

One of the best known ways to inhibit corrosion of iron surfaces, such as carbon steel, which are in contact with corrosive cooling waters is to somehow increase the tendency of the iron surface to form a protective iron oxide film. However, in the usual situation corrosion or rusting occurs because either the type or form of the oxide produced is non-protective or because the film forming reaction is too slow. Thus, soluble iron species are allowed to migrate too far from the surface to be of any appreciable value in forming a surface barrier to ionic and/or molecular corrodants or corrosion products. Dissolved oxygen in the aqueous environment in contact with the iron equipment or container then diffuses to the free metal surface more rapidly and high corrosion rates ensue.

If this diffusion could somehow be slowed down and controlled, corrosive attack would cease or be greatly reduced. Specifically, if, by some means formation of a thin, tightly bonded, uniform film of the proper type of iron oxide over the iron surface could be promoted, the iron system under attack from cooling water media would be less prone to corrode, or in many cases would be substantially non-corrosive.

In order to somehow aid formation of a protective iron oxide film, a chemical composition must not form strong complexes or chelates with soluble iron species which would increase the demand for iron in the cooling water and thereby increase corrosion rates. Yet, such a composition must be able to react with or absorb on iron or the iron oxides at the iron surface to control the crystalline-like growth and habit of the oxides. Also, a chemical treating agent when added to the cooling water system as a corrosion inhibiting substance must be able to reach the metal surface under attack or at least make a very close approach to the surface, certainly within the ionic double layer, while still in active form. In brief, a useful chemical anti-corrosive material should be able to help produce an ideal oxide film in a quick and efficient manner by a facile, close approach to an iron surface to which it can attach itself or be in close proximity. The additive would then be able to adsorb or react with iron species just formed or those which are still in the process of being formed through the additive's active sites, thereby enhancing filming on the iron or steel surface to be protected.

The above problem is a particularly arduous one with which prior art materials have not been dependably able to cope. In some instances, the additive reagents while tying up in some manner the iron which has escaped from the surface of the corroding metal and through the ionic double layer, are thereby rendered almost immediately ineffective. In other words, such prior art material becomes quickly exhausted after some type of reaction or absorption with the iron ions, and is no longer effective in combating corrosion by promotion of protective iron oxide film. On the other hand in some cases, substances added to cooling waters to inhibit corrosion of iron substances in contact with these liquids, are so aggressive in their reaction with iron ions by some type of complexing or chelation, that the concentration of iron ions in solution is rapidly depleted. This then has the adverse effect of shifting the equilibrium reaction at the metal surface and actually increasing the release of iron ions to the water. Metal attack is thereby increased. If, therefore, a corrosion inhibiting the composition could be devised to somehow enhance formation of a protective iron oxide film on surfaces of corrodable iron metals, and obviate the just discussed problems, a substantial advance in the art would be made.

It, therefore, becomes an object of the invention to provide cooling water compositions and method for their use.

Another object is to provide cooling water compositions which will promote formation of a protective iron oxide film upon the surfaces of corrodable iron metals and thereby control the diffusion of oxygen to the free iron metal surface which is susceptible to its corrosive effects.

A special object of the invention is to provide a combination of compounds in a single composition which will protect corrodable iron surfaces in the presence of cooling waters over long periods of time even at relatively low dosages, which compositions are not quickly depleted of activity by rapid reaction of their active sites with water dispersible iron species.

In accordance with the invention, a method of inhibiting corrosion of iron metal surfaces such as heat exchange surfaces in contact with cooling waters, has been discovered. Generally, corrosion as well as fouling of the iron metal surfaces can be controlled through the use of a corrosion inhibiting composition comprising a chelating system which includes both a water dispersible tannin and a sugar compound and a masking agent for the chelating system which comprises a multivalent metal ion.

The above three constituents of the corrosion inhibiting composition are all essential to efficient control of corrosion. Omission of any one of the three ingredients, as will be seen more clearly later, does not give the proper corrosion protection when compared to a cooling water treatment involving all three compounds.

The specific compounds making up the sum total corrosion inhibiting composition may be added to a cooling water separately, or they may be combined into a single product in either liquid or granular form, or in the form of a shaped article of manufacture, e.g., a water treating ball. The subject composition may be readily formed into compact balls which may then be conveniently added to the cooling water.

The chelating system which is added to the cooling water in order to complex or tie up water-dispersible iron species existing in the cooling water includes a water-dispersible tannin and either a sugar acid or salt of a sugar acid.

Greatly preferred water-dispersible tannins are those which have been modified by a variety of synthetic methods by reaction of natural tannins with various chemical reagents. Mixtures of these modified tannins may also be used in preparing the subject compositions.

The tannins have been divided into two principal groups—the catechol tannins and the pyrogallol tannins. After dry distillation the catechol tannins yield catechol as a principal product of decomposition, and the pyrogallol tannins after dry distillation yield pyrogallol Solutions containing catechol give a greenish-black precipitate with ferric salts, whereas solutions containing pyrogallol tannins give a bluish-black precipitate with ferric salts. In general, only pyrocatechol derivatives are found in catechol tannins, whereas gallic acid is always present in pyrogallol tannins. The preferred tannins for use in the subject process are the catechol tannins although pyrogallol tannins can also be used in the process.

Natural tannins can be obtained from a number of materials. One of the principal sources in the quebracho trees, the wood of which contains about 20% to 23% of easily extractable tannin of the catechol type. Other sources include chestnut wood, redwood bark, divi-divi pods, mangrove bark cutch (one of the preferred sources along with quebracho trees), wattle bark, gallnuts, hemlock bark, sumac, and oak bark.

A discussion of tannins and tannin chemistry is set forth in the Encyclopedia of Chemical Technology, vol. 13, pages 578–599, which article is by reference included as part of this disclosure.

In the modification step the tannins are bisulfited by reaction with sulfite, bisulfite or formaldehyde and bisulfite, or are modified by reaction with sodium or ammonium cyanides, with sodium chloroacetate, with sulfuric acid (either sulfonation or oxidation), with nitric acid (which would involve either oxidation or nitration), etc., to produce functional group changes in the natural tannin. Thereby its performance is markedly improved as an aid to its action in the subject treatment.

A preferred group of modified tannins which can be used in the subject invention is described in U.S. Patent 2,831,022. In the process disclosed in this patent, water solutions of sulfurous acid salts of alkali metals or ammonia are caused to react with the insoluble portion of Western hemlock bark at increased temperatures and in the presence of an excess of sulfurous acid. The water-soluble alkali sulfonic acid salts which are produced are separated as water solutions from the reaction mixture. The water solutions can include aqueous sodium sulfite and aqueous sodium bisulfite. The produced compounds are sulfonic acid derivatives or sodium sulfonate derivatives of the tannins occurring in the bark. Such compounds have a high content of phenolic hydroxyl and are relatively non-methoxylated. The disclosure of U.S. Patent 2,831,022 is included in this specification by reference. In the instant process tannins from sources other than hemlock bark which are modified as described in U.S. Patent 2,831,022 also can be used with great success.

The following examples will serve to illustrate synthetic modes of preparation of modified tannins which are usefully employed in the invention.

EXAMPLE I

This example shows one method which can be used to modify tannins. In the method, 100 grams of mangrove tannin was dissolved in 150 ml. of distilled water. A second solution was formed by dissolving 16.6 grams of sodium chloroacetate in 50 ml. of distilled water. The second solution was added slowly to the first solution as the tannin was being heated. The mixture of the two solutions was agitated for one hour at a temperature slightly below boiling. During the mixing 10 ml. of a sodium hydroxide solution was added to maintain the pH of the mixture above 8. The final solution could be used as one of the component inhibitors of the invention or further processed to active solid form.

EXAMPLE II

This example illustrates a second method which can be used to produce the modified tannins of the subject invention. In this method, 50 grams of chestnut tannin was mixed with 0.1 gram of $V_2O_5$, 0.5 ml. of ethyl silicate "40" and 1 ml. of distilled water. The chestnut tannin had previously been passed through an ion exchange resin to remove cations.

Twenty-five (25) ml. of concentrated sulfuric acid was added to the above mixture and the mixture was allowed to react in its own heat for 20 minutes. After 20 minutes, 275 ml. of distilled water was introduced into the reaction mixture. Initially a thick paste was formed which thinned as more water was added. Twenty-five (25) ml. of isopropanol was added to precipitate the reaction product. The precipitate on filtration gave a black-brown cake. The cake was solubilized in water by raising its pH to above 11 with caustic. Again, the solution as diluted could be directly employed or active solid material extracted out.

The tannins can be reacted with nitric acid in a manner similar to sulfuric acid. In both cases the reaction is a nitration or sulfonation and/or oxidation reaction. Likewise, the modification can be carried out through the use of sodium, potassium or ammonium cyanide or sodium, potassium or ammonium thiocyanate in which case the modification procedure would be carried out in a manner similar to that shown above in Example I in connection with sodium chloroacetate. As a substitute for sodium chloroacetate one can use any sodium or potassium haloacetate, halopropionate or halobutyrate. The preferred halogens are chlorine, bromine and iodine. As has been indicated previously, the tannins can also be modified by the method shown in U.S. Patent 2,831,022. The sulfite or bisulfite modifications shown in the patent are preferred for preparation of tannins for use in connection with this invention. In the bisulfite treatment, the reaction is carried out initially at a moderate pH (5–7) whereby the bisulfite addition takes place with the oxy ring structure being split to form additional —OH groups. The solubilizing of the product with caustic preferably is then carried out under sufficiently mild condition (pH of 8–9) so as not to cause the product to hydrolyze or to revert to its original condition. Potassium or ammonium sulfite or bisulfite can be substituted for sodium sulfite or bisulfite in the process. As was indicated above, any natural tannin may be substituted for the hemlock tannin of U.S. Patent 2,831,022. The preferred tannins, however, are the mangrove and/or quebracho tannins.

The second complexing agent which helps comprise the chelating system of the invention is a sugar compound, and more specifically either a sugar acid or salt of a sugar acid. These sugar acids are carbohydrates having carboxylic acid function to a greater or lesser degree. Preferred sugar acids or salts are those in which there is at least one carboxylic group or carboxylic salt group per molecule. Generally, these sugar acids or salts have three or more carbon atoms in the molecule. Representative types are sodium heptogluconate, sodium salt of glucoxyacetic acid, various wood sugars and their salts removed from a cook liquor obtained in pulping of wood such as soft woods, carboxylic acids or acid salts of glucose, allose, dextrose, sucrose, etc. Mono-, di-, tri-, and tetra saccharides having some free carboxyl character or carboxylic salt function may all be usefully employed. Preferred substances are sodium heptogluconate, and the sodium salt of glucoxyacetic acid. The sugar acids or salts may be first prepared and formulated with the other two components of the invention or be formed by reaction of appropriate reactants at the time of the formulation step itself. In some cases the sugar acids may even be formed in situ, that is, by introducing the respective reactants separately into a cooling water and allowing reaction to actually occur in that media. For example, sucrose and chloroacetic acid may be separately added to the cooling water at some point in the system. Immediate reaction then occurs in the aqueous cooling water solution to produce the useful corrosion inhibitor component.

If the sugar acid is derived from a reaction of a sugar, such as sucrose, and a halo carboxylic acid or acid salt such as chloroacetic acid or sodium chloroacetate, it is preferred that a molar ratio of acid or acid salt to sugar of from 1:1 to 4:1 be employed.

The following example illustrates preparation of a typical sugar acid useful as a chelating agent in the invention to inhibit corrosion.

EXAMPLE III 15.20 parts of sucrose, 4.50 parts of chloroacetic acid and 3.80 parts of 50% sodium hydroxide were mixed together and allowed to react at about room temperature while mixing was effected. The strong base was present to neutralize any hydrochloric acid formed in the reaction between the chloroacetic acid and sucrose. The resultant product can be used directly as one of the components of the corrosion inhibitor compositions of the invention.

The just discussed two groups of chemicals, that is, water-dispersible tannins and sugar acids or salts thereof, appear to coact by competing for the water-soluble or dispersible species of iron as it diffuses through the ionic double layer of the cooling water. Both components are necessary, and surprisingly enough, the lack of one cannot be compensated by proportionately increasing the concentration of the other. In fact, in such cases corrosion rates actually increase when large amounts of only one or the other chelating agent are employed. This is due to a changing of the iron concentration in solution, causing in effect a shift in equilibrium towards higher concentrations of iron in solution phase and more rapid corrodability of the iron metal. It is not completely known why both the two chelating classes of compounds are necessary. It appears that competition of the two compounds for the limited iron species, allows more of each of the chelating or complexing agents to reach the surface of the iron metal in an active form where they can be adsorbed or reacted with to promote protective oxide formation.

The third component comprising the compositions of the invention is what is termed as a "masking agent." This is a material which when added with the above described chelating system, associates with the chelating or complexing agents. This reaction or absorption upon the active sites of the chelating agents tends to retard the complexing or chelating reaction of these chemicals with soluble iron species. This allows the "masked" organics to pass through the ionic double layer in a relatively undisturbed state. At the metal surface the organics are then "demasked" by release of the metal cation, allowing more effective reaction or adsoprtion at the surface than otherwise obtainable. As mentioned above, rapid depletion of iron concentration near the surfaces of the walls of the corrodable metal causes either a more severe case of corrosion than would be the situation in absence of additives, or, at the very least, the additives are quickly rendered ineffectively by their active sites being blocked by reacting with or absorbing soluble iron species. The masking agents then, in effect, help to slow down the reaction of the chelating agents with iron to the proper rate whereby both chelating agents remain in an active state long enough for effective reaction at the surface. The masking agents must themselves be capable of being displaced or exchanged by iron at the metal surface as the masked complexing agents approach the surface.

It has been discovered that excellent masking agents which help to retard the complexing action of the chelating agents with soluble iron bodies are polyvalent metal ions. These ions are preferably selected from among zinc, nickel, cadmium, manganese, aluminum and cobalt. These metal ions, as mentioned above, react with the organic active sites whereby the entire corrosion inhibiting composition is allowed to make a close approach to the surface before being inactivated by iron species. Preferred sources of the above ions are water-soluble salts of these metals such as halides, acetates, nitrates, and sulfates. Most preferred are the zinc and cobalt salts in any water-soluble form.

The portion of the three constituents making up the corrosion compositions of the invention may be varied over a wide range according to the type of water under treatment and type of iron metal being protected. Preferred though are corrosion compositions which contain 10–70 parts by weight of water-dispersible tannin, 5–50 parts by weight of sugar acid or salt and 10–60 parts by weight of inorganic water-soluble metal salt. The most preferred compositions comprise 20–60 parts by weight of tannin, 20–50 parts by weight of sugar acid or salt and 20–60 parts by weight of inorganic salt.

The compounds disclosed here are useful in protecting any type of corrodable iron such as mild or carbon steel and alloys of iron.

Again, use amounts of the corrosion inhibiting composition may be varied according to the severity of the corrosion problem. Generally, from about 10 parts of composition per million parts of cooling water to about 500 p.p.m. should be employed. More preferably 25–300 p.p.m. are used, with the most preferred use range being from about 30 to about 100 p.p.m. One specific type of useful application involves a short term high level initial treatment followed by continual low level treatment. For example, a cooling water may be treated with about 300 p.p.m. of the composition of the invention for several days followed by a 30–75 p.p.m. level treatment. The pH of the water itself is preferably adjusted prior to treatment. For optimum results the pH should range from about 6.0 to about 8.0.

It has also been discovered that the corrosion compositions of the invention are useful not only in inhibiting corrosion but have a pronounced tendency to retard deposition of suspended matter upon the corrodable iron surface. Turbid waters are often used as the cooling source and generally contain suspended clay and other forms of suspended silt, calcium and iron salts, microbiological growths, alumina floc, corrosion products themselves, and other suspended solids. These contaminants are present in the natural water or are subsequently introduced by standing in presence of air or through water pretreatment processes. The compositions of the invention help to keep these solids from building up voluminous flocculant deposits upon the surfaces of the iron heat exchange tubes or other surfaces susceptible to such deposition. These deposits can severely reduce heat transfer coefficients in the feedwater flow to heat exchangers, unless controlled. Deposition may be prevented to a substantial degree by addition of the compositions of the invention to cooling water, preferably in the above stated use ranges.

Other materials may also be added to the cooling water along with the masked chelating system in order to increase the performance of that composition under special circumstances. For example, where nickel or copper alloys as well as iron come in contact with the cooling water, sulfhydryl-containing compounds may be employed. These may be classified broadly as nitrogen-containing heterocyclic compounds characterized by a ring nitrogen bonded to a ring carbon. To the ring carbon is attached a non-ring sulfhydryl group. Compounds of this type are 2-mercaptothiazole, 2-mercaptobenzimidazole, 2-mercaptobenzoxazole, 2-mercaptobenzothiazole, and alkali metal salts of the foregoing. Other known corrosion inhibitors such as the sodium salt of a copolymer of ethylene and maleic anhydride, phosphates and chromates may also be successfully employed with the composition of the invention. For example, both ortho and polyphosphates may be used, as well as hexavalent and trivalent chromium such as sodium chromate and sodium dichromate.

A typical composition of the invention which has shown excellent effectiveness in inhibiting corrosion and preventing deposition of suspended solids from cooling water sources has the following composition.

Composition I

| Component: | Percent by weight |
|---|---|
| Sodium salt of glucoxyacetic acid (reaction product of glucose and chloroacetic acid in the presence of caustic soda) | 23.44 |
| Rayflo (a bisulfited tannin produced by the method disclosed in U.S. Patent No. 2,831,022) | 41.35 |
| Mercaptobenzothiazole | 2.35 |
| Zinc sulfate | 30.11 |
| Water | 2.75 |

Composition II

| Component: | |
|---|---|
| Rayflo | 40.2 |
| Sodium heptogluconate | 20.1 |
| Zinc sulfate | 29.9 |
| Sodium salt of 2-mercaptobenzothiazole | 7.8 |
| Water | 2.0 |

In order to demonstrate the effectiveness of the corrosion composition of the invention, as well as the critical necessity for an inclusion of all three components in a treatment of a system under proper corrosion control, the following experiments were conducted. Mild steel coupons 1″ x 2″ were used as test specimens and a moderately hard water was employed to simulate a cooling water. The coupons were placed in the water treated with compounds or series of compounds as shown below. A blank was also run. The water itself had a pH 7.5–8.0. The tests were run at 140° F., for a period of 18 hours. Comparative effectiveness was indicated by the weight loss of the coupon. Table I below shows the type of treatments which were run as well as results in terms of weight loss.

TABLE I

| | Materials Added | P.p.m. | Milligram Weight Loss |
|---|---|---|---|
| 1 | Blank | | 80±7 |
| 2 | Sodium Heptogluconate | 1,000 | 49 |
| 3 | Sulfonated Tannin | 1,000 / 100 | 46 / 78 |
| 4 | Sulfonated Tannin / Sodium Heptogluconate | 100 / 60 | 73 |
| 5 | Zinc from Zinc Sulfate | 25 | 102 |
| 6 | Sulfonated Tannin / Zinc from Zinc Sulfate | 100 / 25 | 33 |
| 7 | Sodium Heptogluconate / Zinc from Zinc Sulfate | 60 / 25 | 17 |
| 8 | Sulfonated Tannin / Sodium Heptogluconate / Zinc from Zinc Sulfate | 40 / 60 / 20 | 7±1 |
| 9 | Sulfonated Tannin / Sodium Heptogluconate / Zinc from Zinc Sulfate / Sodium Salt of Copolymer of Ethylene and Maleic Anhydride | 20 / 30 / 20 / 10 | 6±1 |

An inspection of Table I above demonstrates quite aptly that the three components, comprising the corrosion inhibitors of the invention, are necessary to give adequate control. Any combination of only two is not sufficient to give the type of efficiency expected and desired in a commercial operation.

Obviously, many modifications and variations of the invention as hereinbefore set forth may be made without departing from the spirit and scope thereof. Therefore, only such limitations should be imposed as are indicated in the appended claims.

We claim:

1. A corrosion inhibiting composition useful in preventing corrosion of iron surfaces in contact with cooling waters consisting essentially of a chelating system to complex water-dispersible iron species existing in said cooling water which chelating system comprises 10–70 parts by weight of a water-dispersible tannin and 5–50 parts by weight of a sugar compound selected from the group consisting of sugar acids and salts thereof; and 10–60 parts by weight of a masking agent to retard said complexing action of said chelating system, which comprises a water-soluble inorganic metal salt containing a multivalent metal ion selected from the group consisting of zinc, aluminum, cadmium, cobalt, nickel and manganese.

2. The composition of claim 1 wherein said water-dispersible tannin is a natural tannin having been modified by reaction with a material selected from the group consisting of an alkali metal sulfite, an alkali metal bisulfite, ammonium sulfite, ammonium bisulfite, an alkali metal haloacetate, an alkali metal halopropionate, an alkali metal halobutyrate, ammonium cyanide, an alkali metal cyanide, ammonium thiocyanate, alkali metal thiocyanate, nitric acid, and sulfuric acid.

3. The composition of claim 2 wherein said inorganic salt is zinc sulfate and said sugar compound is the reaction product of 1 mole of sucrose and 1–4 moles of chloroacetic acid.

4. The composition of claim 1 which additionally contains about 2.35 to about 7.8% by weight of a compound selected from the group consisting of 2-mercaptobenzothiazole and its alkali metal salt.

5. A corrosion inhibited cooling water system which comprises an aqueous liquid as a major portion and 10–500 p.p.m. of the composition of claim 1 as a minor portion.

6. A process for inhibiting corrosion of a ferrous metal surface in contact with a corrosive cooling water medium which comprises maintaining contact of said surface with said water which additionally contains a corrosion inhibiting composition consisting essentially of a chelating system to complex water-dispersible iron species existing in said cooling water which chelating system consists essentially of 10–70 parts by weight of a water-dispersible tannin, and 5–50 parts by weight of sugar compounds selected from the group consisting of sugar acids and salts thereof, and 10–60 parts by weight of a masking agent to retard said complexing action of said chelating system which consists essentially of a water-soluble inorganic metal salt containing a multivalent metal ion selected from the group consisting of zinc, cobalt, aluminum, cadmium, manganese and nickel.

7. The process of claim 6 wherein said water-dispersible tannin is a natural tannin having been modified by reaction with a material selected from the group consisting of an alkali metal sulfite, an alkali metal bisulfite, ammonium sulfite, ammonium bisulfite, alkali metal haloacetate, an alkali metal halopropionate, an alkali metal halobutyrate, ammonium cyanide, an alkali metal cyanide, ammonium thiocyanate, an alkali metal thiocyanate, nitric acid and sulfuric acid.

8. The process of claim 7 wherein said water-soluble salt is zinc sulfate and said sugar compound is the reaction product of 1 mole of sucrose and 1–4 moles of chloroacetic acid.

9. The process of claim 6 wherein said composition additionally contains about 2.35 to about 7.8% by weight of a compound selected from the group consisting of 2-mercaptobenzothiazole and its alkali metal salt.

10. The process of claim 6 wherein said cooling water has a pH ranging from about 6.0 to 8.0 and said inhibitor composition is present in said cooling water in an amount of 10–500 parts per million.

11. A process for preventing deposition of matter suspended in cooling waters upon cooling tower surfaces susceptible to said deposition which comprises maintaining contact of said surface with said cooling water which additionally contains a deposit inhibiting composition consisting essentially of 10–70 parts by weight of a water-dispersible tannin, 5–50 parts by weight of a sugar compound selected from the group consisting of sugar acids and salts thereof and 10–60 parts by weight of a water-soluble inorganic metal salt containing a multivalent metal ion selected from the group consisting of cobalt, zinc, cadmium, nickel, aluminum and manganese.

References Cited by the Examiner

UNITED STATES PATENTS

| | | | |
|---|---|---|---|
| 1,910,403 | 5/1933 | Parr et al. | 21—2.7 |
| 2,733,196 | 1/1956 | Hillier et al. | 252—175 XR |
| 2,815,328 | 12/1957 | Green et al. | 252—391 XR |
| 2,831,022 | 4/1958 | Blaricom et al. | 252—8.5 XR |
| 3,105,822 | 10/1963 | Karabinos et al. | 252—156 |

FOREIGN PATENTS 7,398   1915   Great Britain.

JULIUS GREENWALD, *Primary Examiner.*

W. SCHULZ, *Assistant Examiner.*